(12) United States Patent
Siegfriedsen

(10) Patent No.: US 11,028,832 B2
(45) Date of Patent: Jun. 8, 2021

(54) FLOATING WIND TURBINE HAVING A PLURALITY OF ENERGY CONVERSION UNITS

(71) Applicant: aerodyn consulting Singapore pte ltd, Singapore (SG)

(72) Inventor: Sonke Siegfriedsen, Rendsburg (DE)

(73) Assignee: Aerodyn Consulting Singapore PTE LTD, Singapore (SG)

( * ) Notice: Subject to any disclaimer, the term of this patent is extended or adjusted under 35 U.S.C. 154(b) by 82 days.

(21) Appl. No.: 16/306,364

(22) PCT Filed: Apr. 28, 2017

(86) PCT No.: PCT/DE2017/100353
§ 371 (c)(1),
(2) Date: Nov. 30, 2018

(87) PCT Pub. No.: WO2017/206976
PCT Pub. Date: Dec. 7, 2017

(65) Prior Publication Data
US 2019/0211804 A1    Jul. 11, 2019

(30) Foreign Application Priority Data
Jun. 3, 2016    (DE) ............ 10 2016 110 290.3

(51) Int. Cl.
*F03D 13/00*    (2016.01)
*F03D 13/25*    (2016.01)
(Continued)

(52) U.S. Cl.
CPC ............ *F03D 13/25* (2016.05); *F03D 1/02* (2013.01); *B63B 2035/446* (2013.01);
(Continued)

(58) Field of Classification Search
CPC ... B63B 1/107; B63B 2035/446; F03D 13/25; F03D 1/02; F05B 2240/93; Y02E 10/727
(Continued)

(56) References Cited

U.S. PATENT DOCUMENTS 6,294,844 B1    9/2001    Lagerwey
7,156,586 B2    1/2007    Nim
(Continued)

FOREIGN PATENT DOCUMENTS

| CN | 104066980 | 9/2014 |
|---|---|---|
| DE | 102012020052 | 4/2014 |

(Continued)

OTHER PUBLICATIONS

"Guy-Wire." *Wikipedia*, Wikimedia Foundation, Jul. 7, 2019, https://en.wikipedia.org/wiki/Guy-wire.

*Primary Examiner* — Julio C. Gonzalez
(74) *Attorney, Agent, or Firm* — Diederiks & Whitelaw, PLC.

(57) ABSTRACT

The invention relates to a wind turbine comprising a floating base designed as a semi-submersible, a tower arranged on the floating base, at least two arms extending from the tower, a respective energy conversion unit arranged at the free end of each arm, and a cable system connecting the base to the energy conversion units and connecting the energy conversion units to one another in order to introduce the thrust forces acting on the tower, the arms and the energy conversion units into the base, wherein the cable system has a pre-tensioning, the value of which is greater than the loads to be expected during the operation of the wind turbine and acting against the pre-tensioning.

15 Claims, 15 Drawing Sheets

(51) Int. Cl.
*F03D 1/02* (2006.01)
*B63B 35/44* (2006.01)

(52) U.S. Cl.
CPC ... *F05B 2240/2213* (2013.01); *F05B 2240/93* (2013.01); *Y02E 10/727* (2013.01)

(58) Field of Classification Search
USPC ..................................... 290/44, 55; 114/264
See application file for complete search history.

(56) References Cited

U.S. PATENT DOCUMENTS

| | | | | |
|---|---|---|---|---|
| 8,118,538 | B2* | 2/2012 | Pao | B63B 21/50 415/115 |
| 8,197,208 | B2 | 6/2012 | Sharples et al. | |
| 8,471,399 | B2* | 6/2013 | Lefranc | F03D 13/25 290/55 |
| 8,622,011 | B2* | 1/2014 | Jahnig | B63B 1/107 114/267 |
| 2001/0002757 | A1* | 6/2001 | Honda | F03D 1/02 290/55 |
| 2011/0037264 | A1* | 2/2011 | Roddier | B63B 35/44 290/44 |
| 2011/0283640 | A1* | 11/2011 | Miller | E02D 27/42 52/292 |
| 2012/0121340 | A1* | 5/2012 | Pao | B63B 21/50 405/203 |
| 2012/0139253 | A1* | 6/2012 | Lambert | H02K 7/183 290/55 |
| 2015/0259050 | A1* | 9/2015 | Tunbjer | B63B 35/44 114/266 |
| 2016/0230746 | A1* | 8/2016 | Dagher | F03D 13/25 |

FOREIGN PATENT DOCUMENTS

| | | |
|---|---|---|
| DE | 102013005299 | 10/2014 |
| DE | 10 2014 109212 | 1/2016 |
| EP | 1269018 | 1/2003 |
| FR | 2996881 | 4/2014 |
| GB | 2443886 | 5/2008 |
| JP | 2005264865 | 9/2005 |
| JP | 2009030586 | 2/2009 |
| TW | M410105 | 8/2011 |
| WO | 2010/093253 | 8/2010 |
| WO | 2011/065840 | 6/2011 |
| WO | 2013/074027 | 5/2013 |
| WO | 2014/060420 | 4/2014 |
| WO | WO-2016000681 A1 * | 1/2016 ............ B63B 21/50 |

* cited by examiner

FLOATING WIND TURBINE HAVING A PLURALITY OF ENERGY CONVERSION UNITS

CROSS-REFERENCE TO RELATED APPLICATIONS

This application represents the U.S. National Phase of International Application number PCT/DE2017/100353 entitled "Floating Wind Turbine Having a Plurality of Energy Conversion Units" filed 28 Apr. 2017, which claims priority from and the benefit of German patent application No. 10 2016 110 290.3 filed on 3 Jun. 2016. The entire contents of these applications are incorporated herein by reference.

BACKGROUND OF THE INVENTION

The invention relates to a floating wind power plant having a plurality of power convertor units. In particular, the invention relates to a floating wind power plant having a floating foundation, a tower arranged on the floating foundation, at least two outriggers extending from the tower having a power convertor unit arranged on the free end of each outrigger and a cable system connecting the foundation to the power convertor units and the power convertor units to each other.

Offshore wind power plants having footings anchored on the seabed have been known for some time, wherein constructions having a plurality of power convertor units have already been proposed; see GB 2 443 886 A, DE 10 2012 020 052 B3.

Floating wind power plants that have a floating substructure, that is, a floating foundation, generally exhibit a structure with a tower arranged on a floating foundation that has, for example, a power convertor unit comprising a rotor, a rotor bearing, a drive and a generator; see GB 2 489 158 A, DE 10 2014 109 212 A1.

As a rather rare case, a floating wind power plant is known from WO 2014/060 420 A1 having two rotors that are arranged on a floating foundation designed as a "ballasted SPAR." The two power convertor units are here arranged at the free ends of two outriggers that are mounted on the SPAR and connected to each other via guys. The plants are designed having downwind turbines and are designed to jointly orient themselves in the wind automatically. To do this, a bearing is arranged around the spar in the underwater area that must have a diameter in the range of from 8-10 m at the plant size in question.

Bearings of this type are currently not available and if so, are very labor intensive and expensive to manufacture.

In addition, it is already clear that the complete structural system made from a SPAR floater and a wind power plant arranged above it would tend to have powerful and uncontrollable torsional oscillations because there is no preexisting torsional stability.

Finally, the outriggers, at the ends of which the two turbines are mounted, must introduce the thrust of the rotors into the SPAR structure as bending moments. This, in turn, requires a large amount of material.

The object of the invention is therefore to produce a floating wind power plant to be manufactured with low expenditure on material and little work effort that can withstand the forces from the wind and the waves that act on the floating wind power plant.

This objective is achieved according to the invention by a floating wind power plant having the features of claim 1. The independent claims represent advantageous embodiments of the invention.

SUMMARY OF THE INVENTION

In contrast to the known plant from WO 2014/060 420 A1, in the floating wind power plant according to the invention, the floating structure that is designed to be half-submerged is not submerged in the water at only one point but at points spatially distributed in a plane. This causes the floating stability to be substantially greater and the draft substantially less and the complete structure has a torsional stiffness because of its horizontal spatial expanse and thus can be adjusted to the changes in wind direction to be stable in the water.

In particular, according to a preferred embodiment of the wind power plant, a Y structure is used that is arranged in the underwater area, at the three ends of which three buoyancy bodies ("floaters") are arranged. The guys of the cable system are guided to the power convertor units on the upper end of these floaters outside the water zone. An additional guy is located between the two power convertor units that takes on the weight load of the two power convertor units. The two guys from the two plants to the floater that are arranged upwind serve to absorb the thrusts that are generated by the rotors and introduce them into the floater and the Y structure. The two outriggers that carry the power convertor units at their respective ends are only slightly stressed by bending moments.

The guys arranged below the two power convertor units have the task of absorbing rearward thrust when plant is braked and introducing it into the floater arranged on the lee side. The cable system is pretensioned enough that, when no load is to be received, a cable is unloaded and no longer has pretensioning.

The floaters are preferably arranged in the inclination of the individual guys. The leeward floater as seen from the side is inclined toward the tower in the angle of the leeward guys.

The leeward floaters are also inclined toward the tower in the angle of the leeward guys. The pretensioning of the articulated guys at each power convertor unit is adjusted so that the resulting force from all pretensioning acts precisely in the axis of the outriggers. This design results in no bending moments being introduced into the outrigger structure, instead only compressive forces.

The position of the articulation points on the converging guys is to be chosen so that low structural loads are produced over the shortest distances possible. It is advantageous in this context to allow the guys to converge at one point.

An advantageous load transmission behavior results from the inclined position of the floater. On the one hand, the wave loads together with the loads of the guys are compensated on the floater, specifically (partially) by the buoyancy forces, so that the Y foundation is loaded less and does not have such large dimensions. In addition, the bending moment in the Y foundation can be further lessened by the intentional flooding of the Y foundation chambers.

According to the invention, a wind power plant is also provided that has a floating foundation designed to be half-submerged, a tower arranged on the floating foundation, at least two outriggers extending from the tower, each having a power convertor unit arranged on the free end of each outrigger, and a cable system connecting the foundation to the power convertor units and the power convertor units to each other, wherein the cable system has a pretensioning greater than loads working against the pretensioning that would be expected in the operation of the wind power plant.

The cable system is specifically designed so that thrust forces acting on the tower, the outriggers and the power convertor units are introduced into the foundation via the prestressed cables. The pretensioning must therefore be great enough that no cable can slacken at any instant.

The cable system can in principle comprise a single cable. The cable system, however, preferably comprises a plurality of cables.

According to a preferred embodiment, the force vector resulting from the pretensioning of the cable system is located in the axis of the cantilevers averaged over time during use of the wind power plant.

The floating foundation is preferably designed as a Y-shaped platform having a long arm and two short arms, wherein the tower is arranged at the connection point of the three arms.

Particularly preferably, the wind power plant is designed having downwind turbines and the tower is inclined leeward.

An additional advantageous embodiment is achieved if at least two power convertor units are arranged above the free end of the short arms.

The cable system is designed in particular in such a manner that it is articulated at the free end of the long arm and/or at the free ends of the short arms.

Alternatively, the cable system is only articulated at the free end of the long arm, wherein the power convertor units are also connected to the free ends of the short arms by means of supports.

The floating foundation specifically has a floater at the free ends of each of its arms that is connected to the foundation on its sides facing the tower. These floaters are particularly preferably arranged in such a manner that the longitudinal axis of each floater is in at least one plane with a power convertor unit.

According to a particularly preferred embodiment, it is also provided that the floating wind power plant is equipped with two power convertor units, each having a two-bladed rotor, wherein the longitudinal axes of the rotor blades of the two power convertor units are regulated with a 90° phase shift during operation with respect to each other.

Specifically in the case of a design with two power convertor units, each having one rotor with at least one rotor blade, the directions of rotation of the two rotors are configured in opposite directions so that the gyroscopic forces acting on the structure as a whole are counterbalancing.

If the plant is braked, however, and the rotors are brought into the parked position, the rotor blades in the parked position are aligned identically, specifically horizontally.

The advantage of the invention, among others, is that an offshore wind power plant can be provided, the total output of which is made up of a plurality of individual plants. In particular, conventional plants of average output that have already been tested and can be cost-effectively built are used for the technical realization of such a wind power plant according to the invention, so that individual, low output plants can be used that already have a suitable approval. In this manner, the labor and time expenditure for producing the wind power plant according to the invention are significantly reduced.

BRIEF DESCRIPTION OF THE FIGURES

The invention is explained in detail below in reference to particularly preferably designed exemplary embodiments depicted in the accompanying drawings. Shown are.

DETAILED DESCRIPTION OF THE PREFERRED EMBODIMENTS

Figure 1:
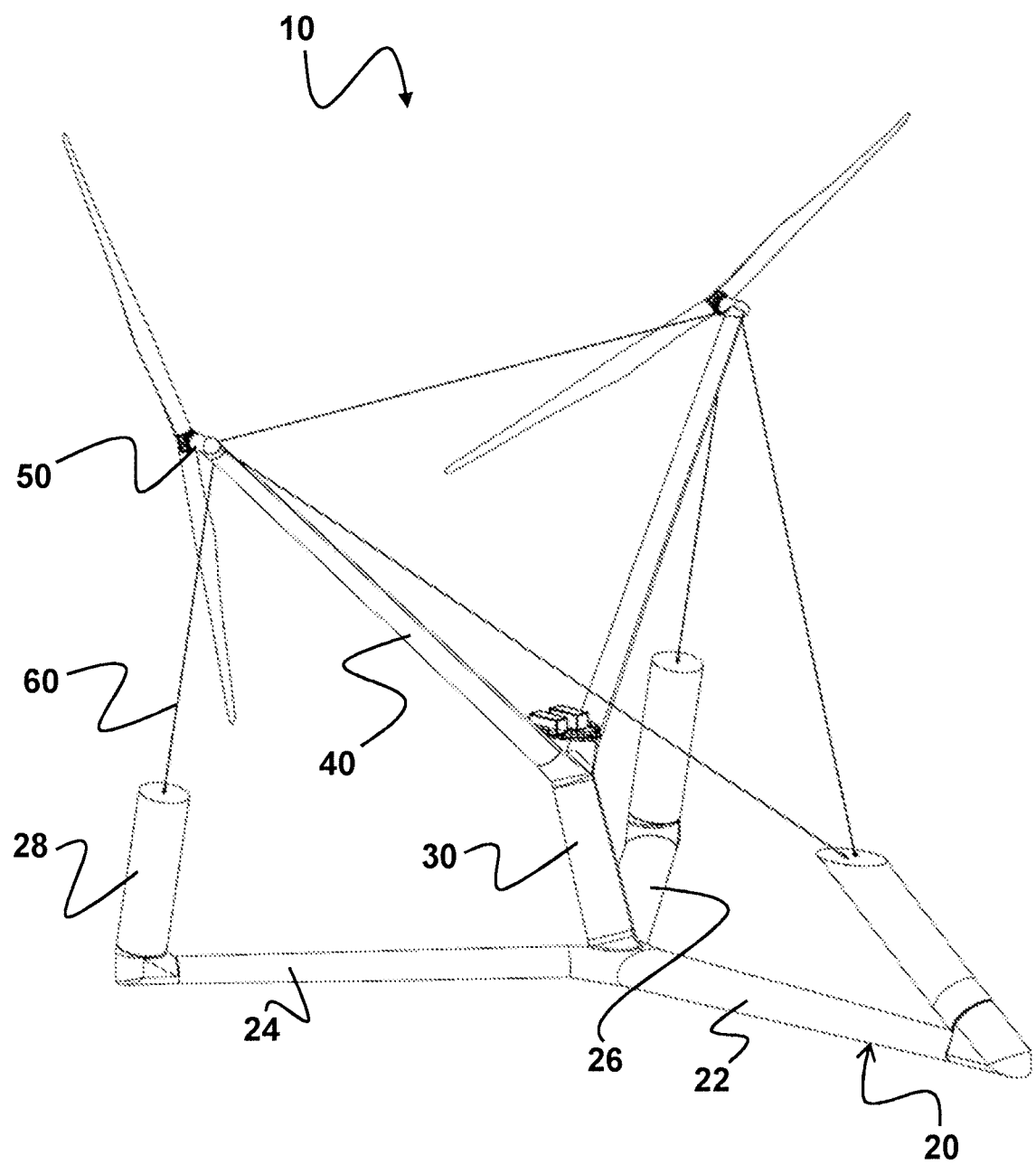
FIG. 1 A first exemplary embodiment of a particularly preferably designed wind power plant according to the invention in a perspective view from the leeward side.
Figure 2:
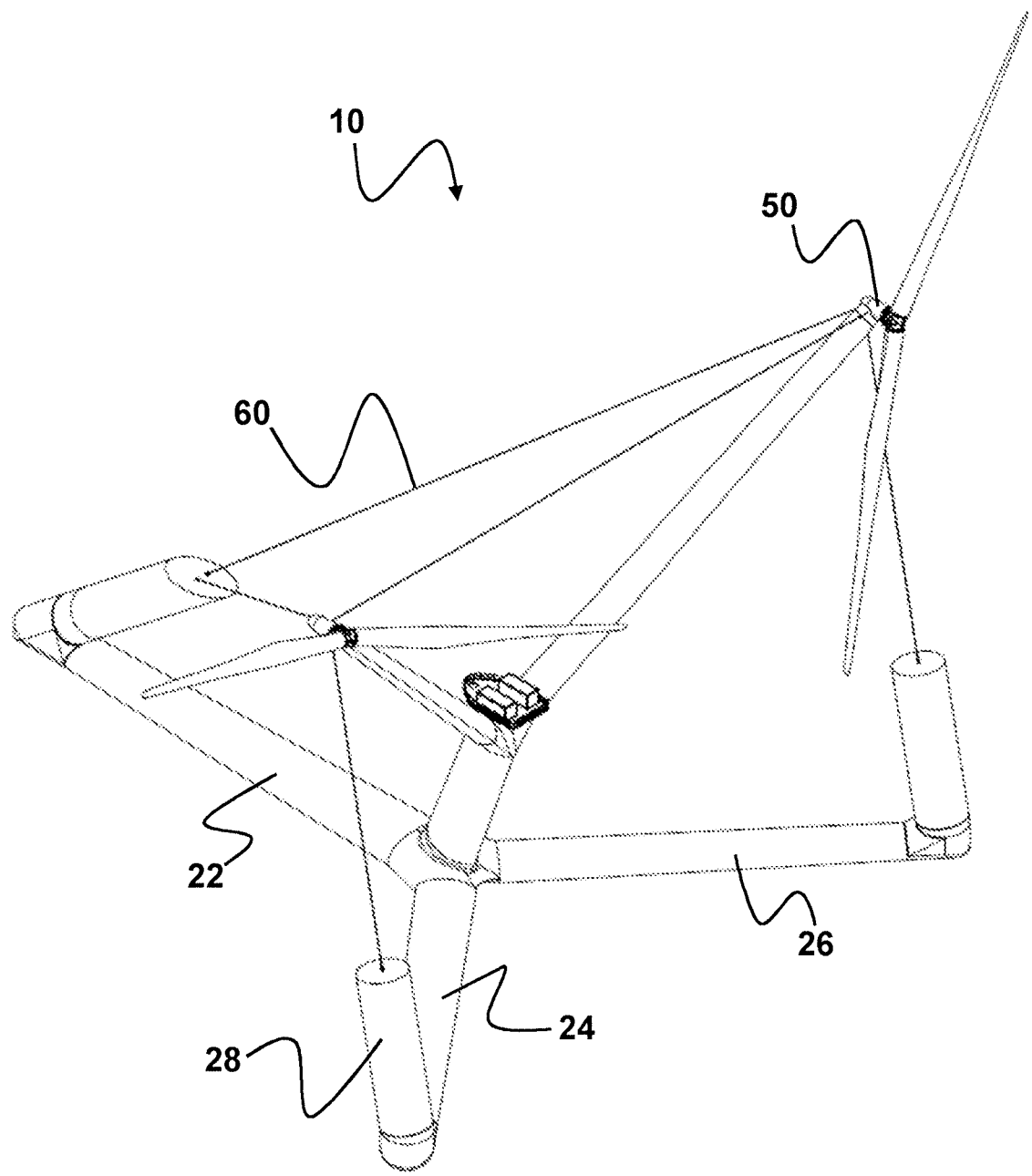
FIG. 2 The wind power plant according to the first exemplary embodiment in a perspective view from the leeward side.
Figure 3:
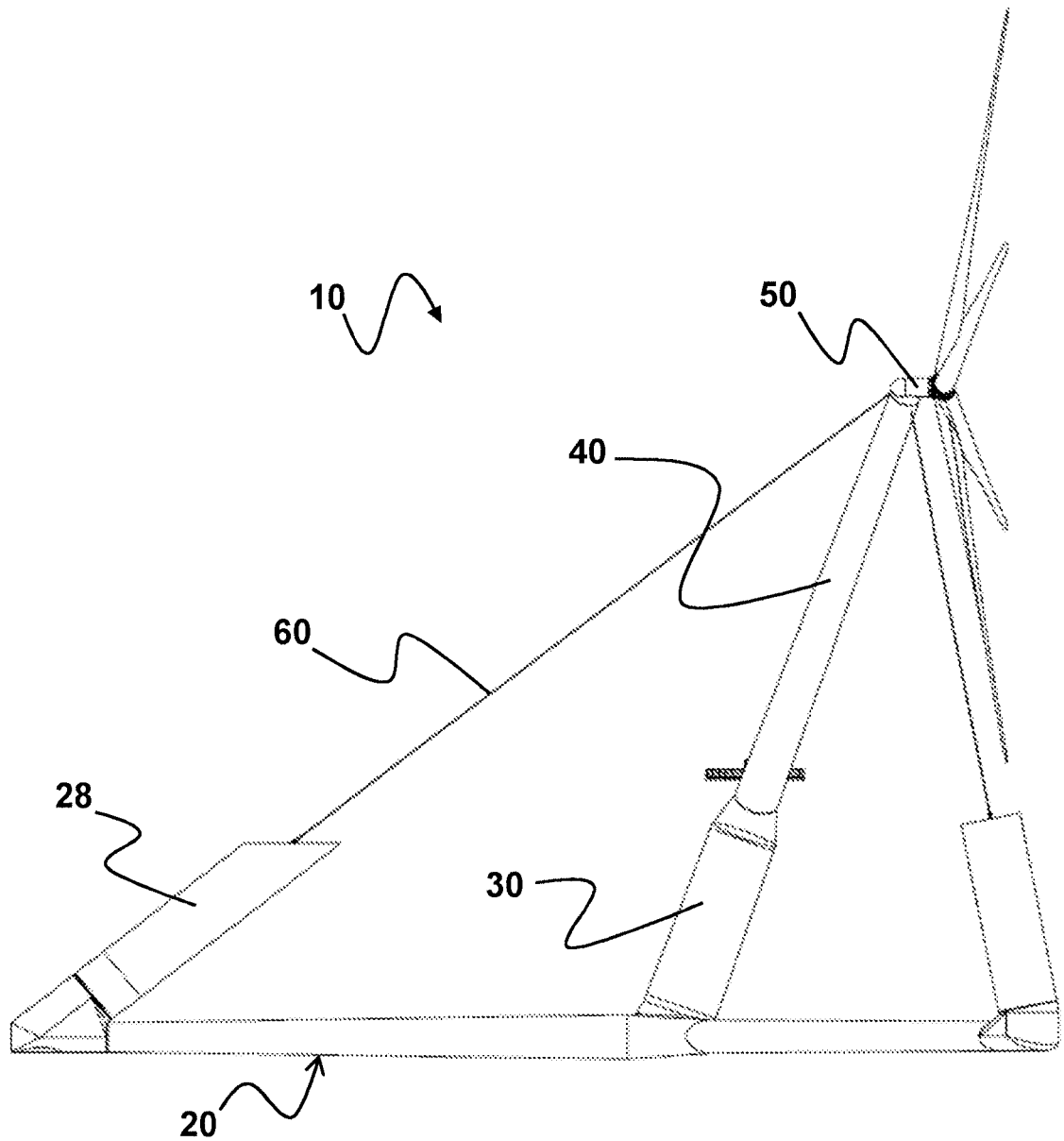
FIG. 3 The wind power plant according to the first exemplary embodiment in a side view.
Figure 4:
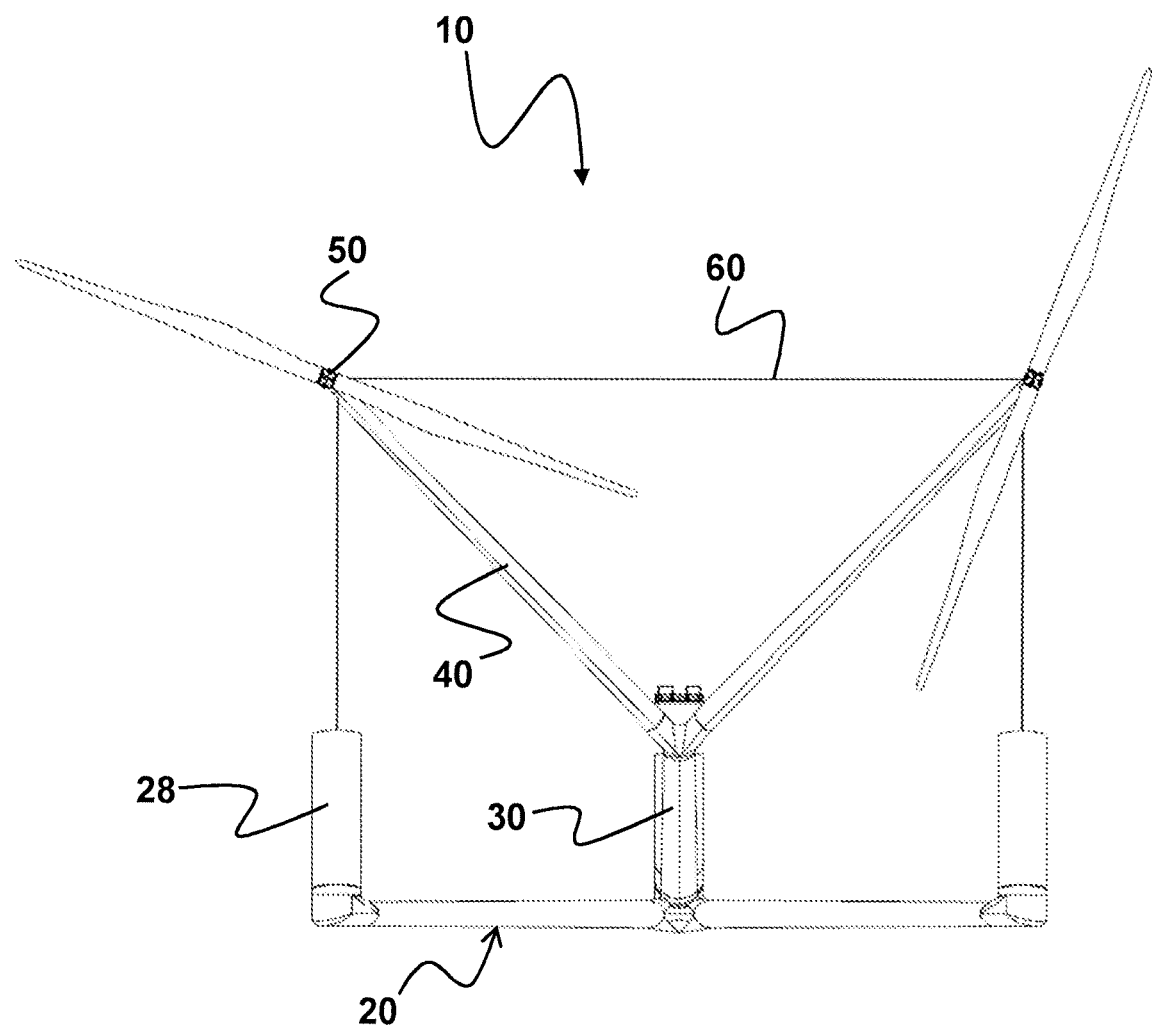
FIG. 4 The wind power plant according to the first exemplary embodiment in a front view from the lee side.
Figure 5:
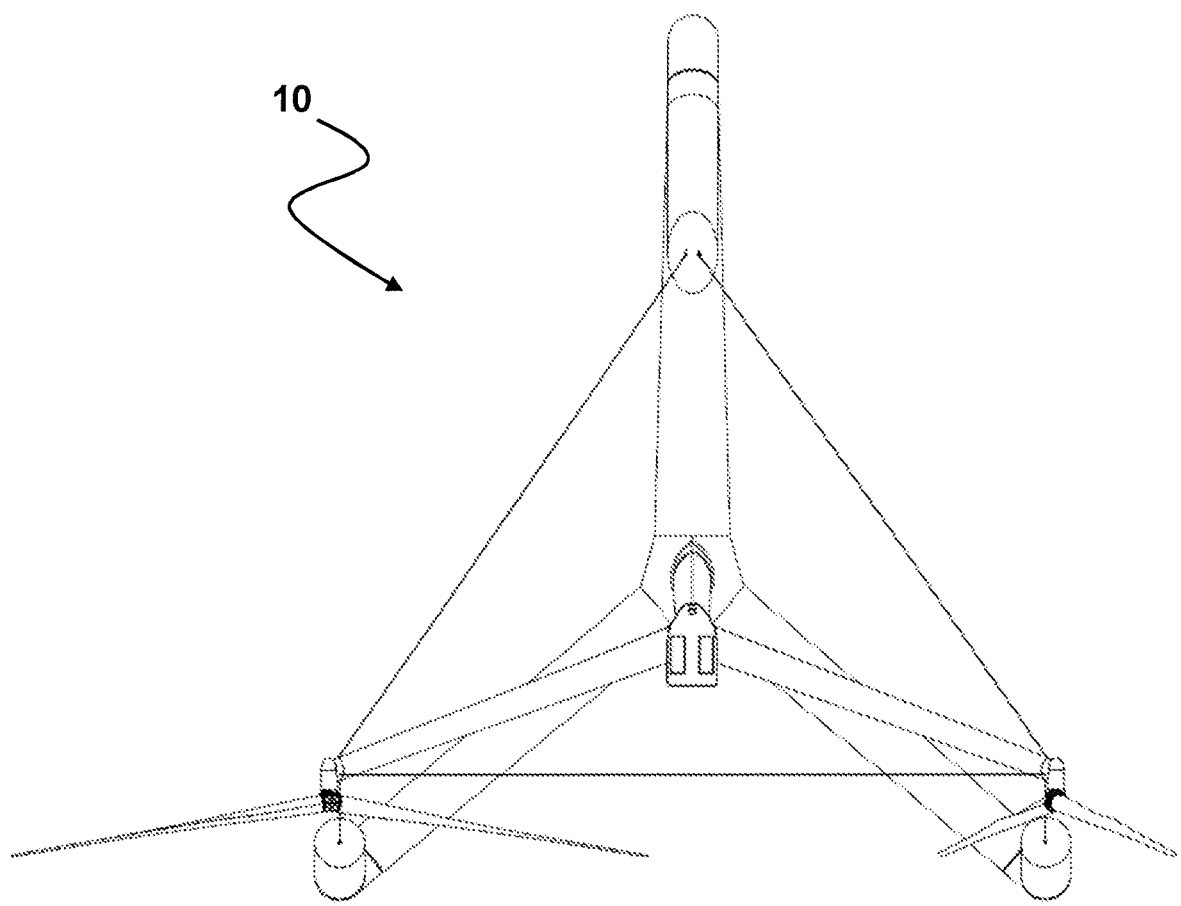
FIG. 5 The wind power plant according to the first exemplary embodiment in a top view.

FIG. 1 shows a first exemplary embodiment of a particularly preferably designed wind power plant according to the invention in a perspective view from the leeward side. The subsequent drawings FIGS. 2 to 5 show the same wind power plant in the additional views mentioned above.

The illustrated wind power plant 10 has a foundation designed as a half-submerged floating foundation 20 with a tower 30 arranged on foundation 20 and two cantilevers 40 extending from tower 30. On the free end of each cantilever 40, a power convertor 50 is arranged, wherein a cable system 60 made of a plurality of cables is provided, ultimately connecting foundation 20 to power convertor units 50 and power convertor units 50 to each other for introducing the thrust acting upon tower 30, cantilevers 40 and power convertor units 50 into foundation 20, wherein cable system 60 has a pretensioning greater than loads working against the pretensioning that would be expected in the operation of the wind power plant 10.

In particular, cable system 60 is designed so that the force vector resulting from the pretensioning of cable system 60 is located in the axis of cantilevers 40 averaged over time during use of wind power plant 10.

Floating foundation 20 is preferably designed as a Y-shaped platform having a long arm 22 and two short arms 24, 26, wherein tower 30 is arranged at the connection point of the three arms 22, 24, 26.

Tower 30 can be designed as a buoyancy body 28 (a "floater").

Cable system 60 can directly abut foundation 20 or be indirectly connected to foundation 20 by cable system 60 being connected to floaters 28 arranged on the free ends of foundation 20.

The drawings show that wind power plant 10 is designed having downwind turbines, and tower 30 is inclined leeward. This therefore results in the possibility of arranging power convertors 50 in such a manner that power convertors 50 are each arranged above the free ends of short arms 24, 26.

As the views clearly show, the longitudinal axis of each floater 28 is aligned in at least one plane with a power convertor unit 50 so that there is an optimal introduction of force into the structures of wind power plant 10.

Wind power plant 10 is designed so that the directions of rotation of the two rotors of power convertor units 50 are in opposite directions. This design as a whole has a positive effect on the dynamic behavior of floating wind power plant 10 because the gyroscopic forces are compensated.

Specifically, the rotor blades are designed having a phase shift with respect to each other during operation—in the exemplary embodiment illustrated, the blades of power convertor units 50 are therefore arranged having a 90° phase shift with respect to one another.

Figure 6:
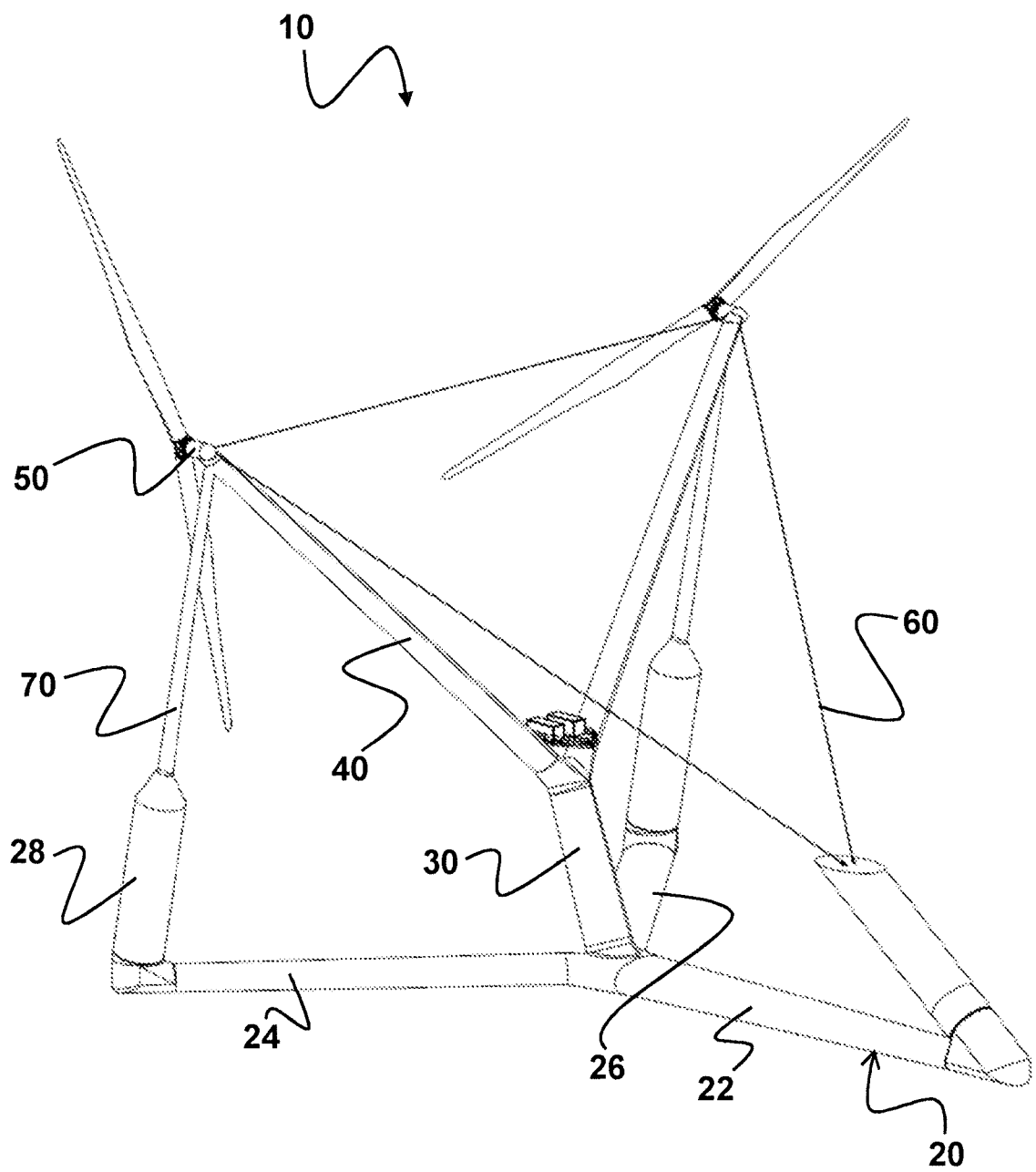
FIG. 6 A second exemplary embodiment of a particularly preferably designed wind power plant according to the invention in a perspective view from the leeward side.
Figure 7:
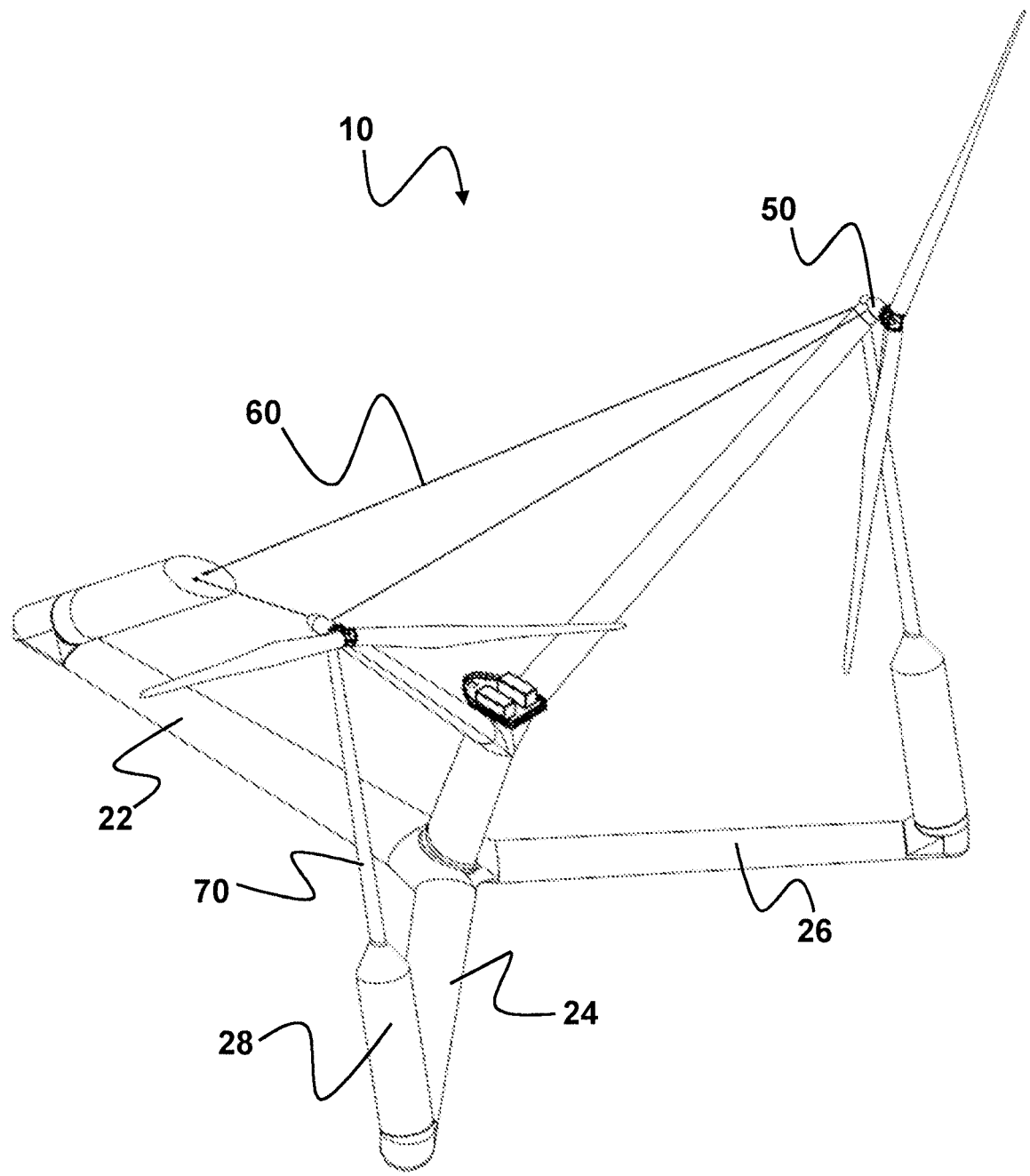
FIG. 7 The wind power plant according to the second exemplary embodiment in a perspective view from the leeward side.
Figure 8:
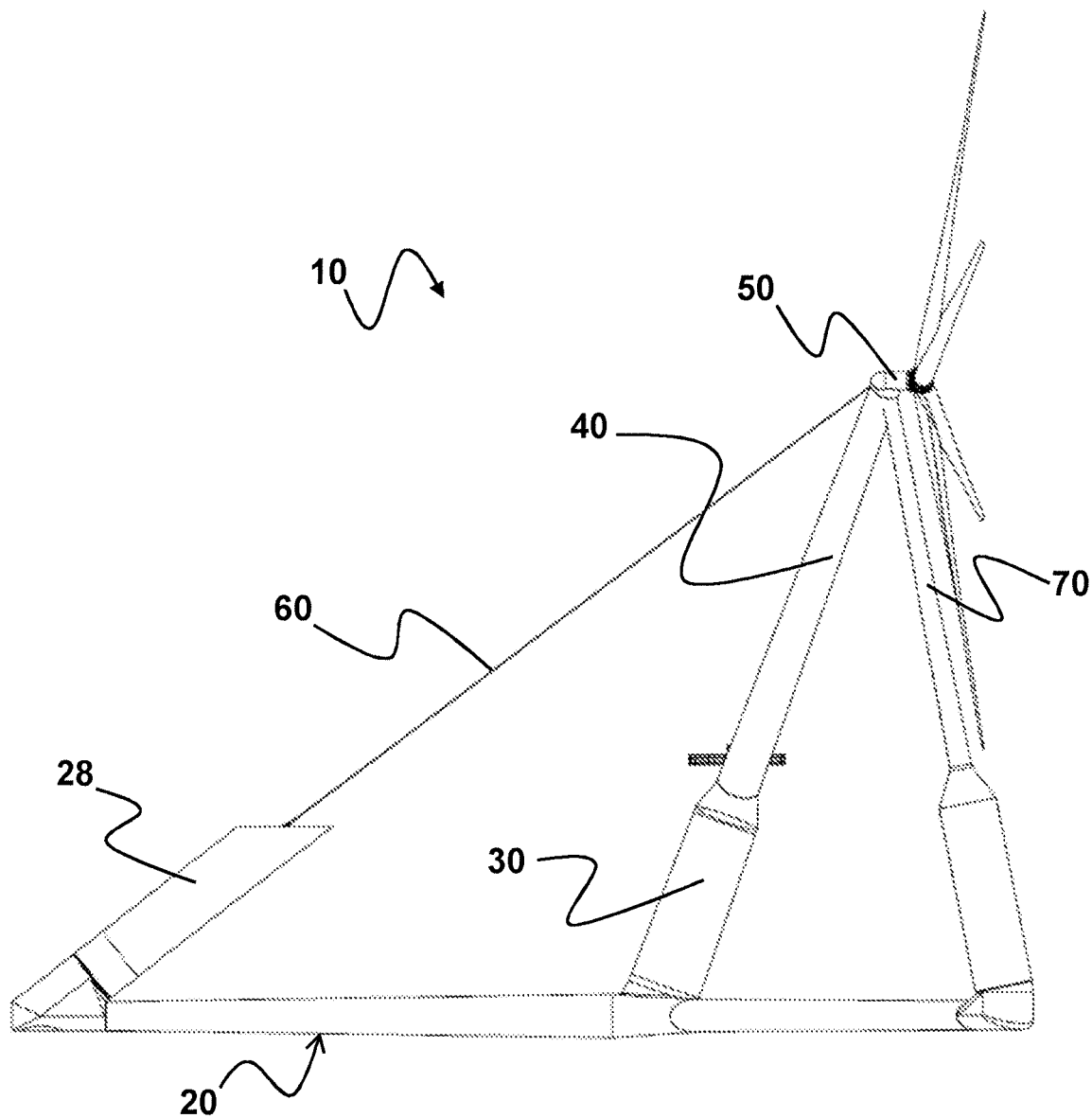
FIG. 8 The wind power plant according to the second exemplary embodiment in a side view.
Figure 9:
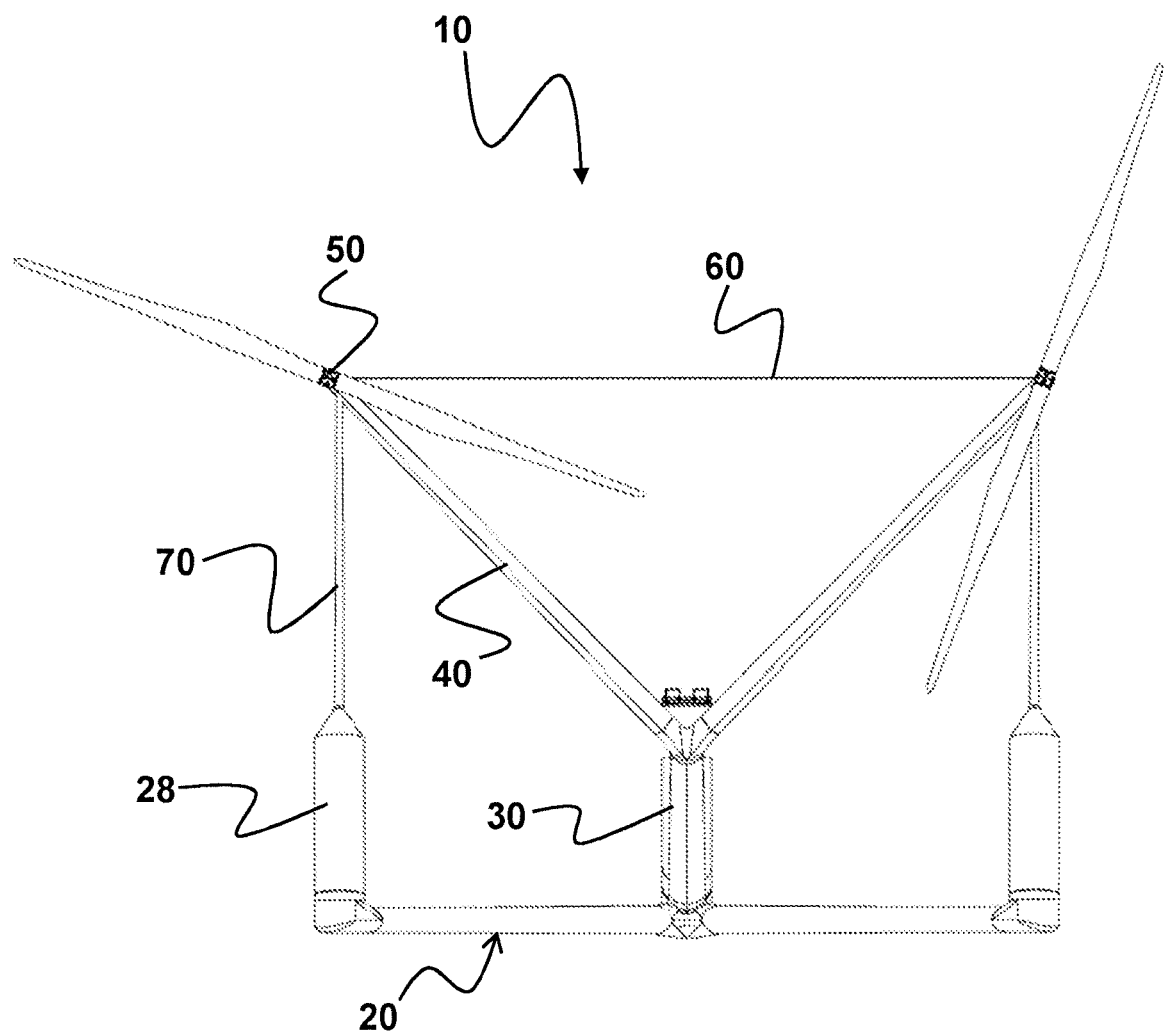
FIG. 9 The wind power plant according to the second exemplary embodiment in a front view from the leeward side.
Figure 10:
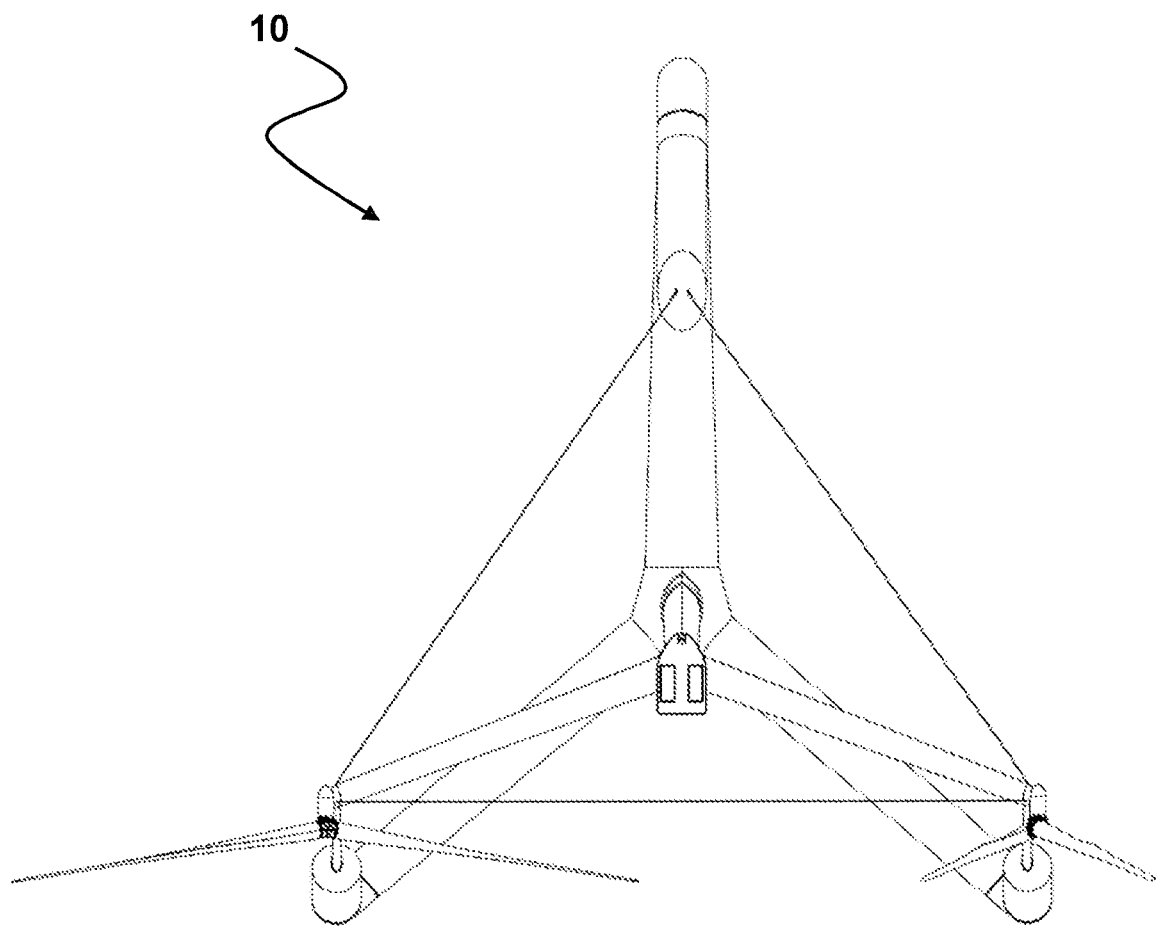
FIG. 10 The wind power plant according to the second exemplary embodiment in a top view.

FIG. 6 shows a second exemplary embodiment of a particularly preferably designed wind power plant according to the invention in a perspective view from the leeward side. The subsequent drawings FIGS. 7 to 10 show the same wind power plant in the additional views mentioned above.

The second exemplary embodiment differs from the exemplary embodiment shown in FIGS. 1 to 5 in that the cable system is articulated at the free end of long arm 22 of foundation 20 and power convertor units 50 are connected by means of supports 70 to the free ends of short arms 24, 26.

In the second exemplary embodiment, cables 60, which connect power convertor units 50 to the free ends of short arms 24, 26, are thus replaced by supports 70, which, in particular in reference to their longitudinal axis, are incompressible and torsionally rigid.

This design supports the introduction of the thrust forces acting on power convertors 50 into foundation 20, but means an increased material expenditure compared to the first exemplary embodiment. This increased material expenditure is justified however, depending upon the wind loads arising in specific areas, wherein cable system 60, which connects long arm 22 of foundation 20 to power convertors 50 and power convertors 50 to each other, additionally has the advantages according to the invention.

Figure 11:
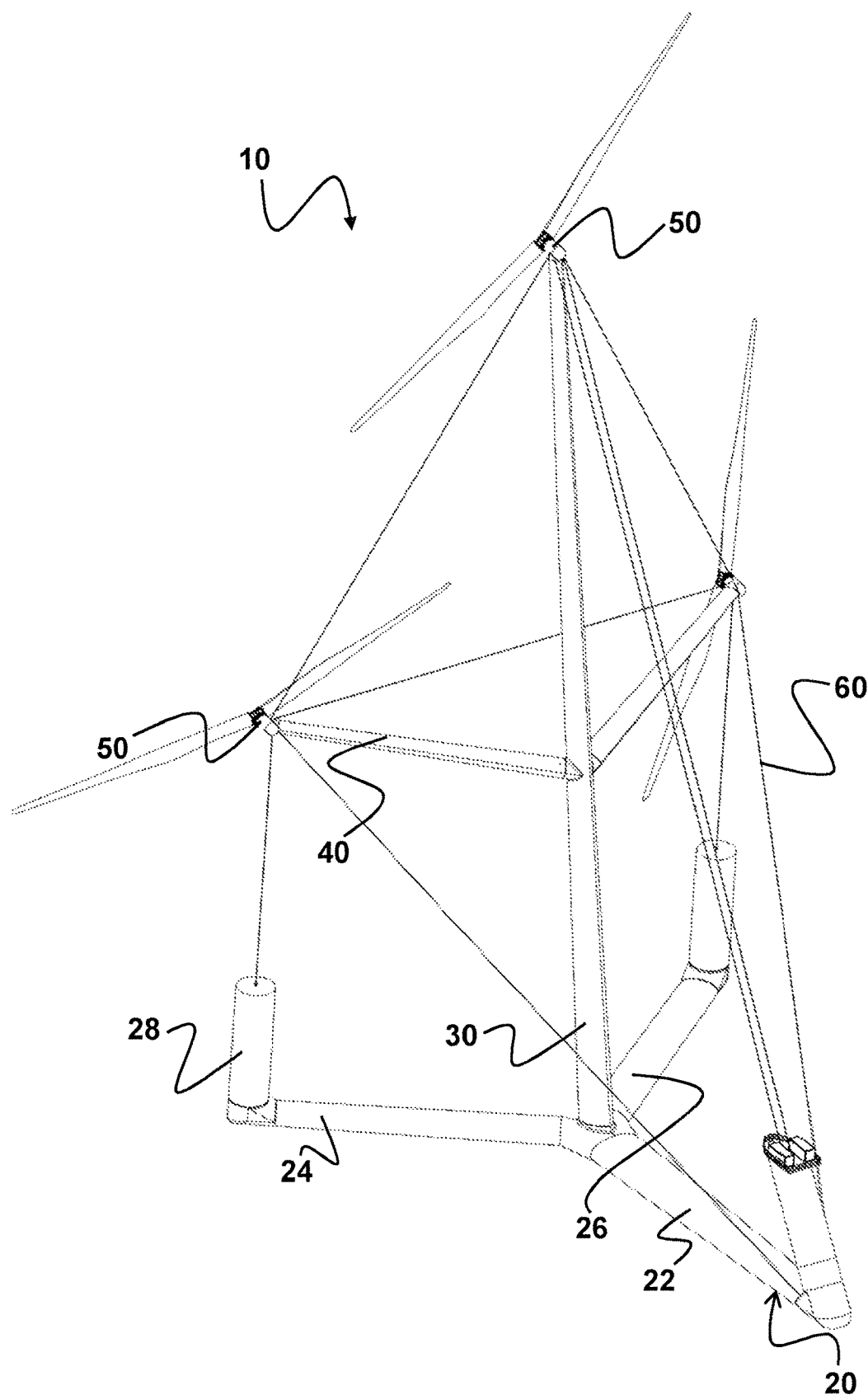
FIG. 11 A third exemplary embodiment of a particularly preferably designed wind power plant according to the invention in a perspective view from the leeward side.
Figure 12:
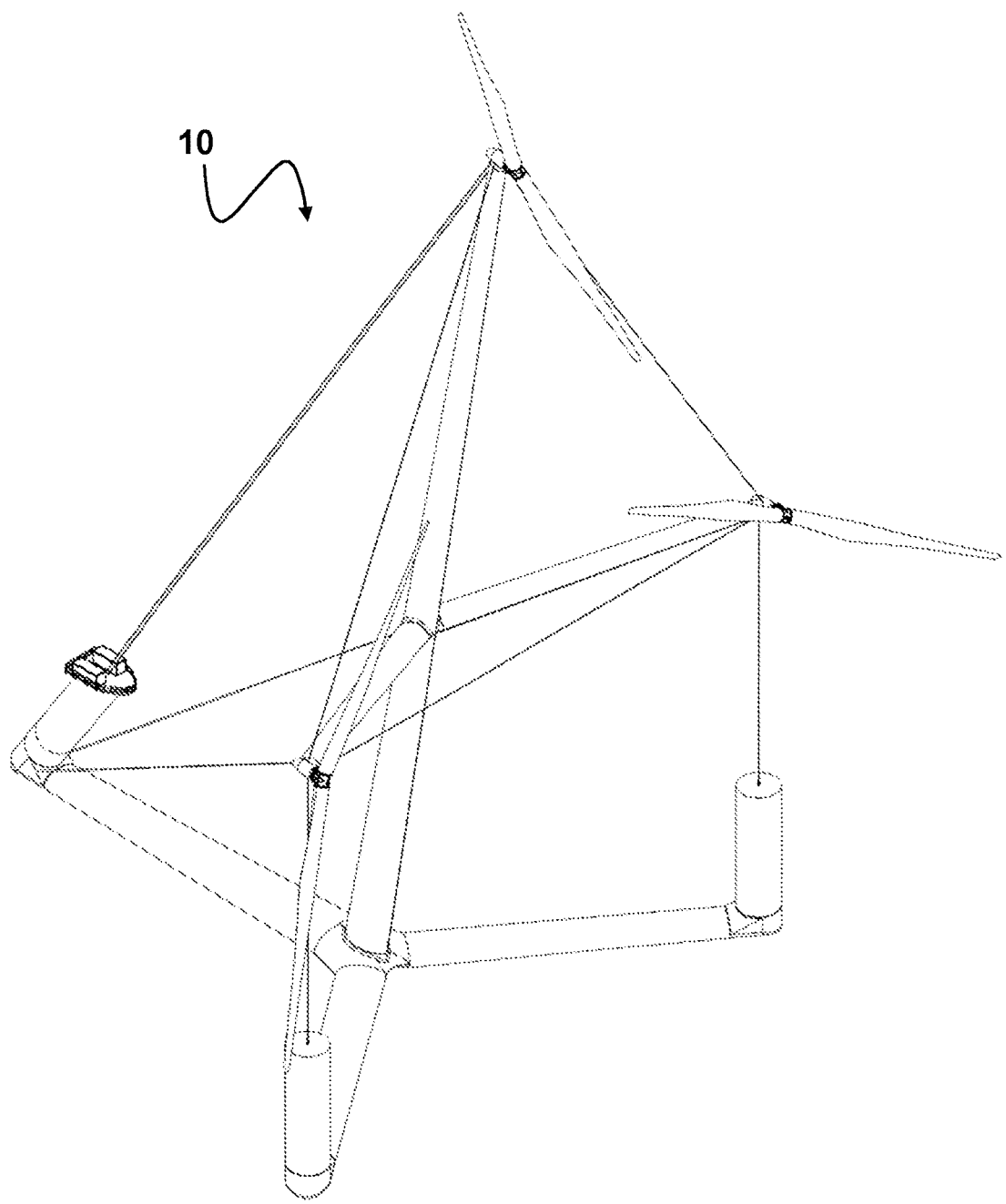
FIG. 12 The wind power plant according to the third exemplary embodiment in a perspective view.
Figure 13:
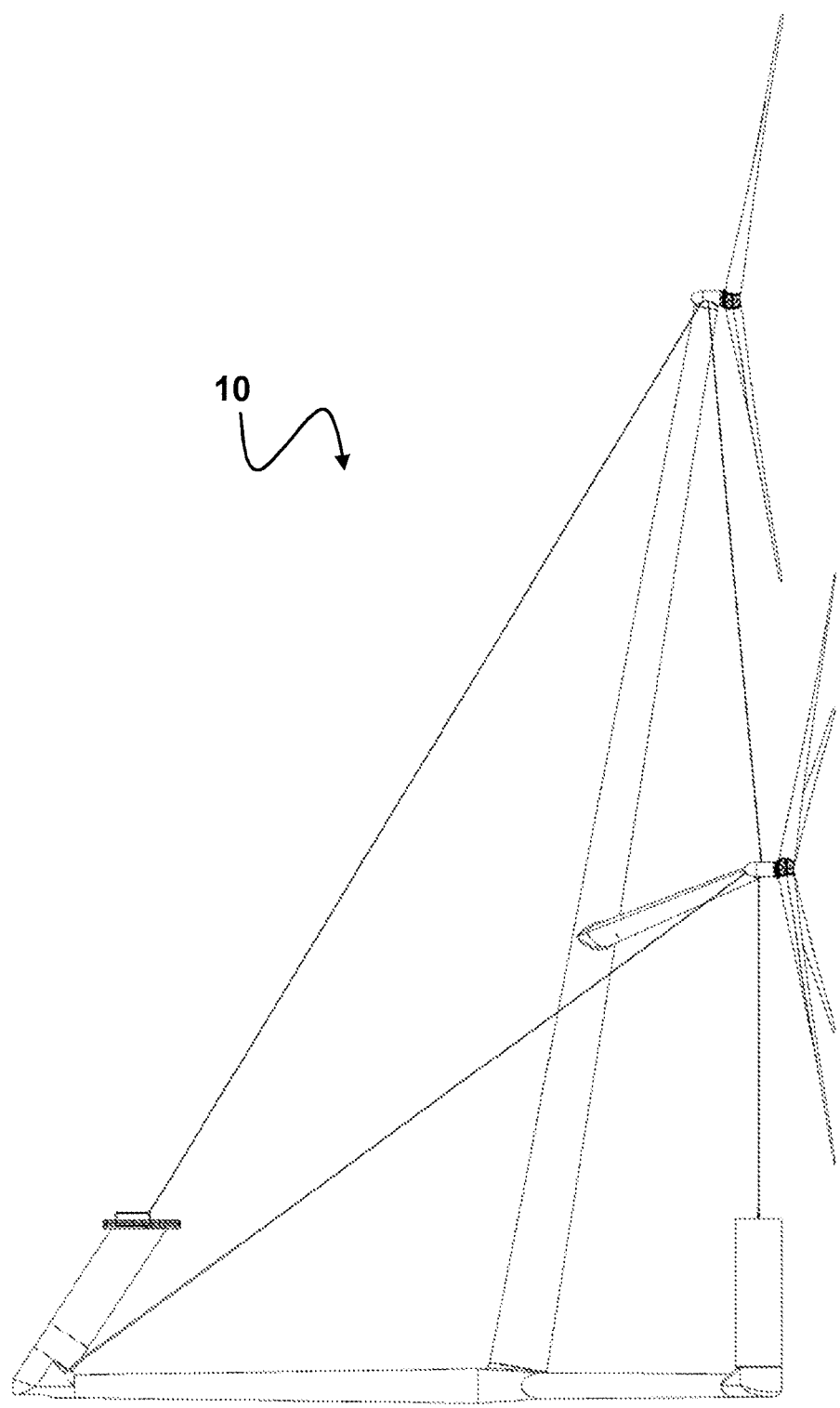
FIG. 13 The wind power plant according to the third exemplary embodiment in a side view.
Figure 14:
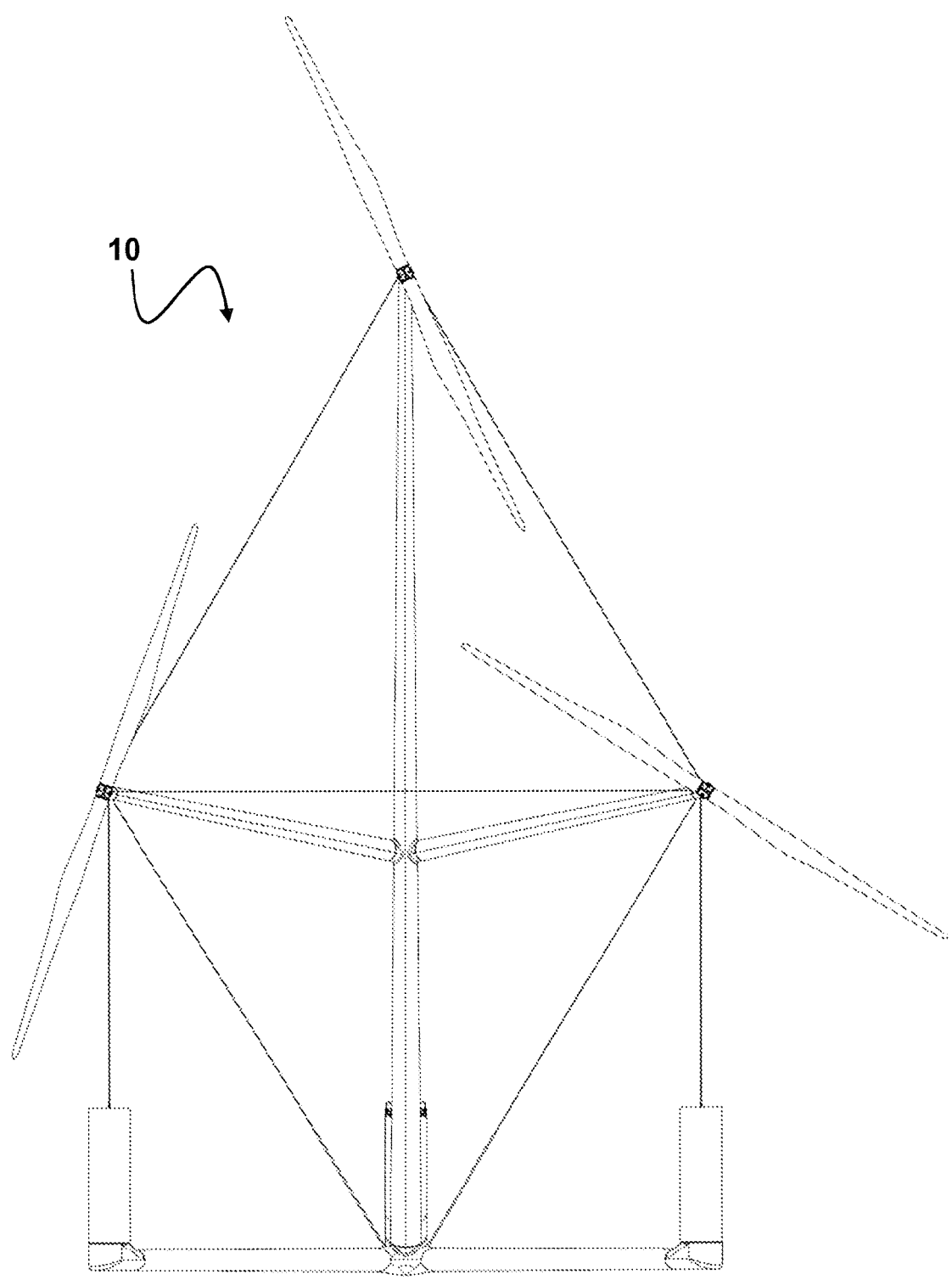
FIG. 14 The wind power plant according to the third exemplary embodiment in a front view from the leeward side.
Figure 15:
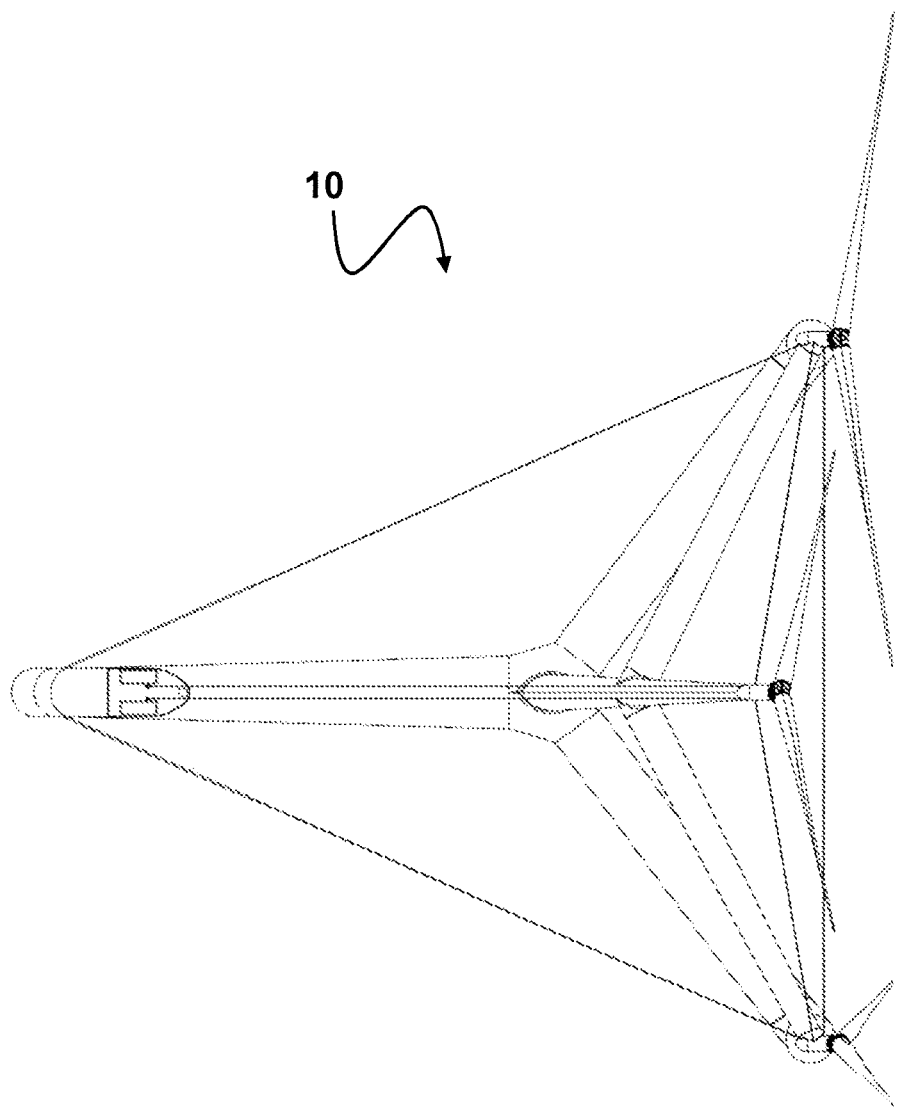
FIG. 15 The wind power plant according to the third exemplary embodiment in a top view.

FIG. 11 finally shows a third exemplary embodiment of a particularly preferably designed wind power plant according to the invention in a perspective view from the leeward side; The subsequent drawings FIGS. 12 to 15 show the same wind power plant in the additional views mentioned above.

In contrast to the exemplary embodiment illustrated in FIGS. 1 to 5 not just two power convertors 50 are provided, but three power convertors. Tower 30 is thus lengthened beyond the starting point of the two cantilevers 40 and carries an additional power convertor unit 50 at its end.

This third power convertor unit 50 arranged on tower 30 is preferably designed identical to the other two power convertor units 50. Alternatively, the third power convertor unit 50 can also be equipped, for example, with a 3-bladed rotor, wherein the power convertor units arranged on cantilevers 40 are equipped with 2-bladed rotors.

Cable system 60 in this exemplary embodiment is, in any case, designed in a more complex manner so that foundation 20 is tensioned along with each power convertor unit 50 and power convertor units 50 with each other via cable 60.

The invention claimed is:

1. A wind power plant having;
    a floating foundation designed to be half-submerged, wherein the floating foundation is designed as a Y-shaped platform having a long arm and two short arms, each short arm being shorter than the long arm,
    a tower arranged on the floating foundation, wherein the tower is arranged at a connection point of the arms and the long arm extends from the connection point to a free end of the long arm and the two short arms extend from the connection point to a respective free end of each short arm,
    at least two cantilevers extending from the tower to a free end of each cantilever,
    power converter units, wherein each power convertor unit is arranged on the free end of each cantilever, and
    a cable system including at least two supports connecting the foundation to each of the power convertor units and at least one support connecting the power convertor units to each other for introducing the thrust acting upon the tower, the cantilevers and the power convertor units into the foundation, wherein the cable system has a pretensioning and each power convertor unit is arranged above the respective free end of each short arm.

2. The wind power plant according to claim 1, wherein a force vector resulting from the pretensioning of the cable system during use of the wind power plant is located in the axis of one of the cantilevers.

3. The wind power plant according to claim 1, wherein the wind power plant is designed having downwind turbines and the tower is inclined leeward.

4. The wind power plant according to claim 1, wherein the cable system is connected by a flexible joint to the free end of the long arm and/or at free ends of the short arms.

5. The wind power plant according to claim 1, wherein the cable system is connected by a flexible joint to the free end of the long arm and the power convertor units are connected via supports to free ends of the short arms.

6. The wind power plant according to claim 1, wherein the floating foundation has a floater connected to each free end of the arms.

7. The wind power plant according to claim 6, wherein the longitudinal axis of each floater is aligned in at least one plane with a power convertor unit.

8. The wind power plant according to claim 1, comprising two power convertor units, each having a rotor having at least one rotor blade, wherein the directions of rotation of the two rotors are in opposite directions.

9. The wind power plant according to claim 1, comprising two power convertor units, each having a rotor with at least one rotor blade, wherein the rotor blades are regulated during operation in a phase-shifted manner with respect to each other.

10. The wind power plant according to claim 1, comprising two power convertor units, each having a rotor with at least one rotor blade, wherein the rotor blades in the farm position are aligned identically.

11. A wind power plant having;
a floating foundation designed to be half-submerged, wherein the floating foundation is designed as a Y-shaped platform having a long arm and two short arms, each short arm being shorter than the long arm,
a tower arranged on the floating foundation, wherein the tower is arranged at a connection point of the arms and the long arm extends from the connection point to a free end of the long arm and the two short arms extend from the connection point to a respective free end of each short arm,
at least two cantilevers extending from the tower to a free end of each cantilever,
power converter units, wherein each power convertor unit is arranged on the free end of each cantilever, and
a cable system including at least two guys connecting the foundation to each of the power convertor units and at least one guy connecting the power convertor units to each other for introducing the thrust acting upon the tower, the cantilevers and the power convertor units into the foundation, wherein the cable system has a pretensioning and at least one power convertor unit is arranged above the respective free end of each short arm.

12. The wind power plant according to claim 11, wherein a force vector resulting from the pretensioning of the cable system during use of the wind power plant is located in the axis of one of the cantilevers.

13. A wind power plant having;
a floating foundation designed to be half-submerged, wherein the floating foundation is designed as a Y-shaped platform having a long arm and two short arms, each short arm being shorter than the long arm,
a tower arranged on the floating foundation, wherein the tower is arranged at a connection point of the arms and the long arm extends from the connection point to a free end of the long arm and the two short arms extend from the connection point to a respective free end of each short arm,
at least two cantilevers extending from the tower to a free end of each cantilever,
power converter units, wherein each power convertor unit is arranged on the free end of each cantilever, and
a cable system connecting the foundation to each of the power convertor units for introducing the thrust acting upon the tower, the cantilevers and the power convertor units into the foundation, wherein the cable system has at least three supports connected to each power converter unit, and at least one power convertor unit is arranged above the respective free end of each short arm.

14. The wind power plant according to claim 13, wherein a force vector resulting from the pretensioning of the cable system during use of the wind power plant is located in the axis of one of the cantilevers.

15. The wind power plant according to claim 13, wherein at least one of the supports is a guy.

\* \* \* \* \*